(12) United States Patent
Reinke et al.

(10) Patent No.: US 11,818,988 B2
(45) Date of Patent: Nov. 21, 2023

(54) IRRIGATION SYSTEM HAVING IMPROVED CONSTRUCTION SYSTEM AND ADJUSTABLE CROWN HEIGHT

(71) Applicant: Reinke Manufacturing Company, Inc., Deshler, NE (US)

(72) Inventors: Russell Scott Reinke, Davenport, NE (US); Jon Patrick Henry, Deshler, NE (US); Bradley George Weatherl, Fairbury, NE (US); Mark Randall Virus, Hebron, NE (US); Darin Joseph Neff, Hebron, NE (US)

(73) Assignee: Reinke Manufacturing Company, Inc., Deshler, NE (US)

( * ) Notice: Subject to any disclaimer, the term of this patent is extended or adjusted under 35 U.S.C. 154(b) by 0 days.

(21) Appl. No.: 18/085,255

(22) Filed: Dec. 20, 2022

(65) Prior Publication Data

US 2023/0118810 A1  Apr. 20, 2023

Related U.S. Application Data

(62) Division of application No. 16/378,088, filed on Apr. 8, 2019.

(51) Int. Cl.
*A01G 25/02* (2006.01)
*E04C 3/02* (2006.01)
(Continued)

(52) U.S. Cl.
CPC ........... *A01G 25/02* (2013.01); *A01G 25/092* (2013.01); *E04C 3/02* (2013.01); *F16B 7/0406* (2013.01); *Y10T 403/57* (2015.01)

(58) Field of Classification Search
CPC .. F16B 7/00; F16B 7/04; F16B 7/0406; F16B 7/0426; E04C 3/02; E04C 2003/0486; E04C 2003/0491; A01G 25/09; A01G 25/092
See application file for complete search history.

(56) References Cited

U.S. PATENT DOCUMENTS

| | | |
|---|---|---|
| 4,982,546 A | 1/1991 | Lange |
| 5,082,391 A | 1/1992 | Florida |

(Continued)

OTHER PUBLICATIONS

*Valley* vs. *Zimmatic*, AD11260 Competitive Comparisons Manual 12/10, Valmont Irrigation, © 2010 Valmont Industries, Inc., Valley, Nebraska 68064, Available at: https://docplayer.net/50250542-Valley-vs-zimmatic-_0.html, 100 pages.

(Continued)

*Primary Examiner* — Jonathan P Masinick
(74) *Attorney, Agent, or Firm* — SHOOK, HARDY & BACON L.L.P.

(57) ABSTRACT

An irrigation system having a pipeline supported by one or more towers includes an improved truss connection system having a means for readily adjusting a crown height of the pipeline. A pair of cooperating members define a joint which selectively couples headed ends of adjacent truss rods together to form a truss rail of a truss system that supports the pipeline. A single fastener may fasten the cooperating members, a strut, and a cross-member together at the joint. A length of the truss rail may be decreased by holding the truss rods closer together. In an aspect, the headed ends of the adjacent truss rods are held closer together by inserting a shim in one of the joints. Decreasing the length of the truss rail increases the deflection of the pipeline and raises the crown height.

10 Claims, 14 Drawing Sheets

(51) Int. Cl.
*A01G 25/09* (2006.01)
*F16B 7/04* (2006.01)

(56) References Cited

U.S. PATENT DOCUMENTS

| | | | |
|---|---|---|---|
| 5,947,393 A | 9/1999 | Unruh | |
| 6,378,265 B1 | 4/2002 | Konstandt | |
| 6,755,363 B2 | 6/2004 | Weatherl et al. | |
| 8,959,868 B2* | 2/2015 | Robinson | E04C 3/08 |
| | | | 52/693 |
| 9,091,052 B1 | 7/2015 | Summers et al. | |
| 9,279,520 B2* | 3/2016 | Korus | F16L 23/0286 |
| 9,784,298 B2 | 10/2017 | Weatherl | |
| 10,724,563 B1 | 7/2020 | Weatherl et al. | |
| 11,363,766 B2* | 6/2022 | Gerdes | B05B 12/087 |
| 2006/0237564 A1 | 10/2006 | Korus | |
| 2008/0313992 A1 | 12/2008 | Schornack | |
| 2012/0080545 A1 | 4/2012 | Korus | |

OTHER PUBLICATIONS

Non-Final Office Action dated Feb. 27, 2023 in U.S. Appl. No. 16/378,088, 06 pages.
Final Office Action dated Aug. 3, 2023 in U.S. Appl. No. 16/378,088, 6 pages.

* cited by examiner

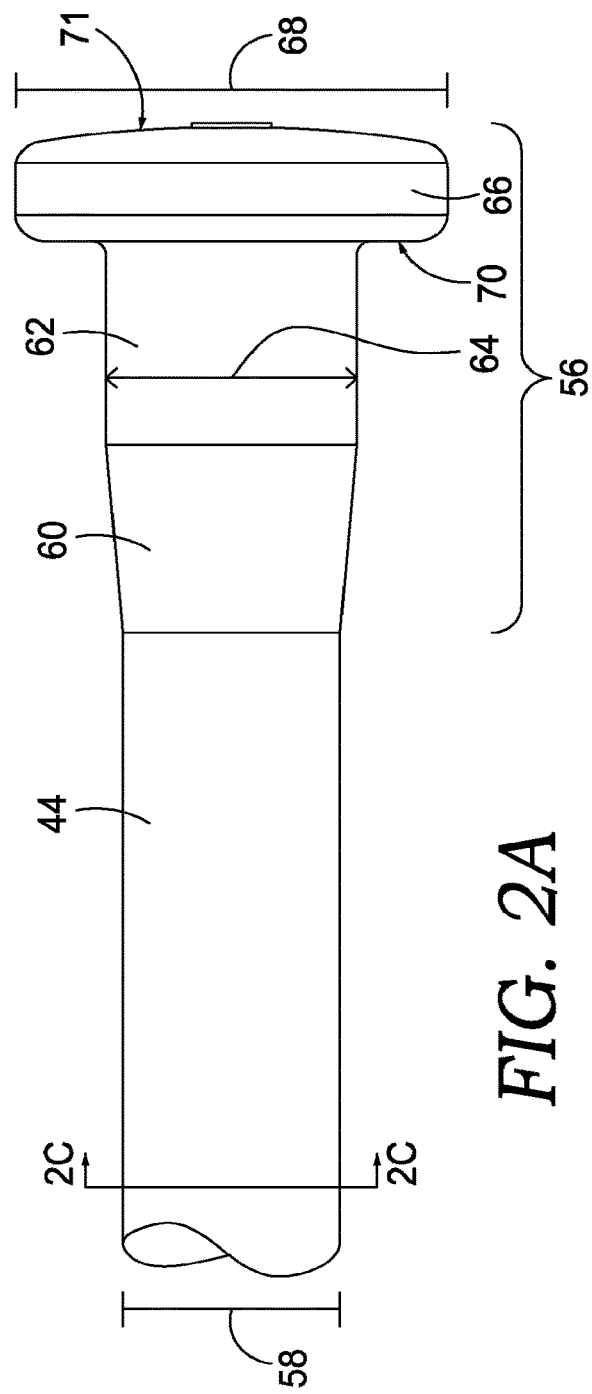
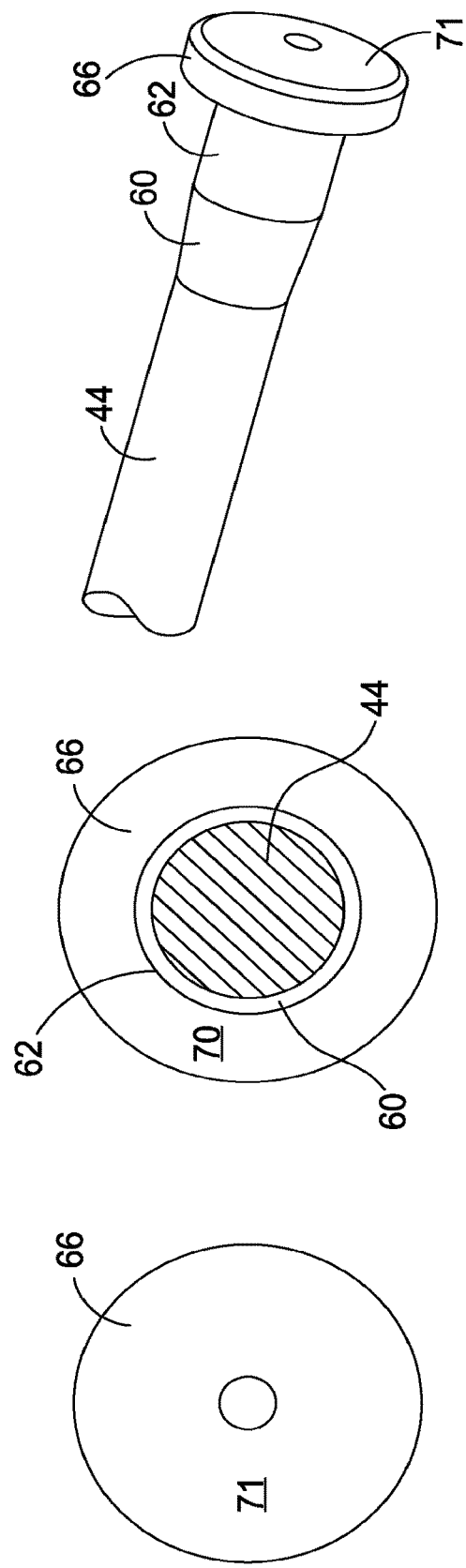
FIG. 2A
FIG. 2B
FIG. 2C
FIG. 2D

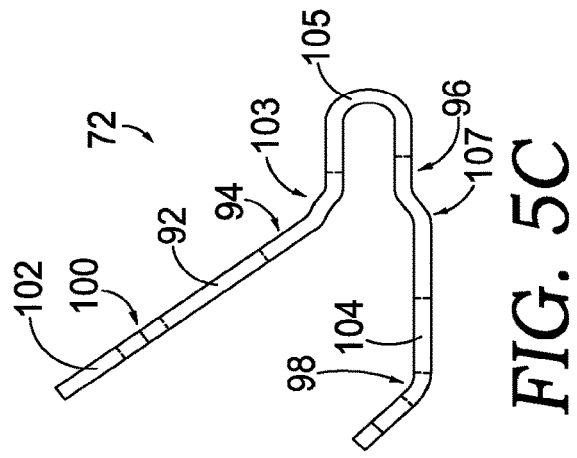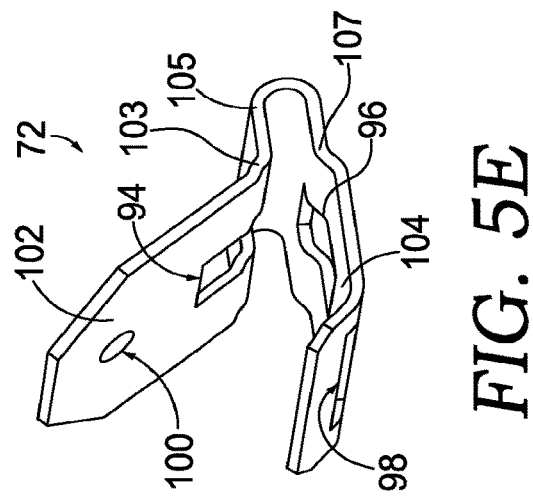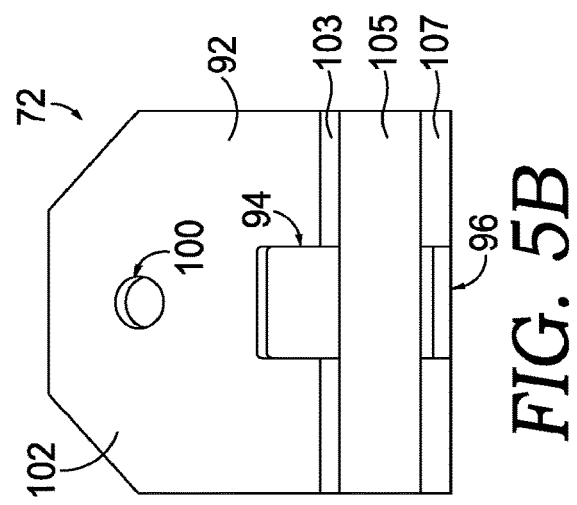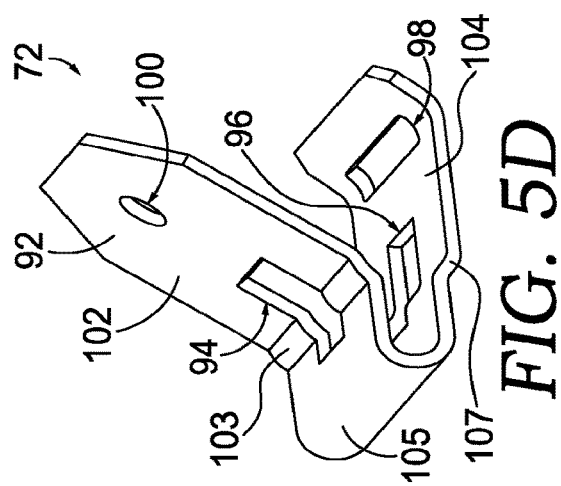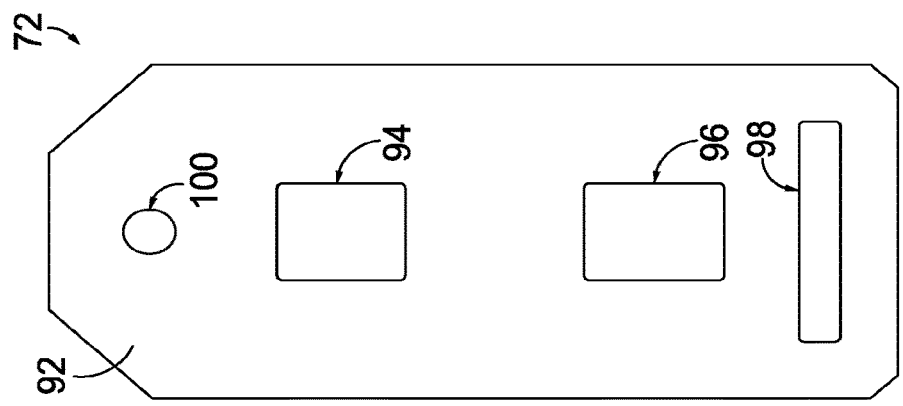

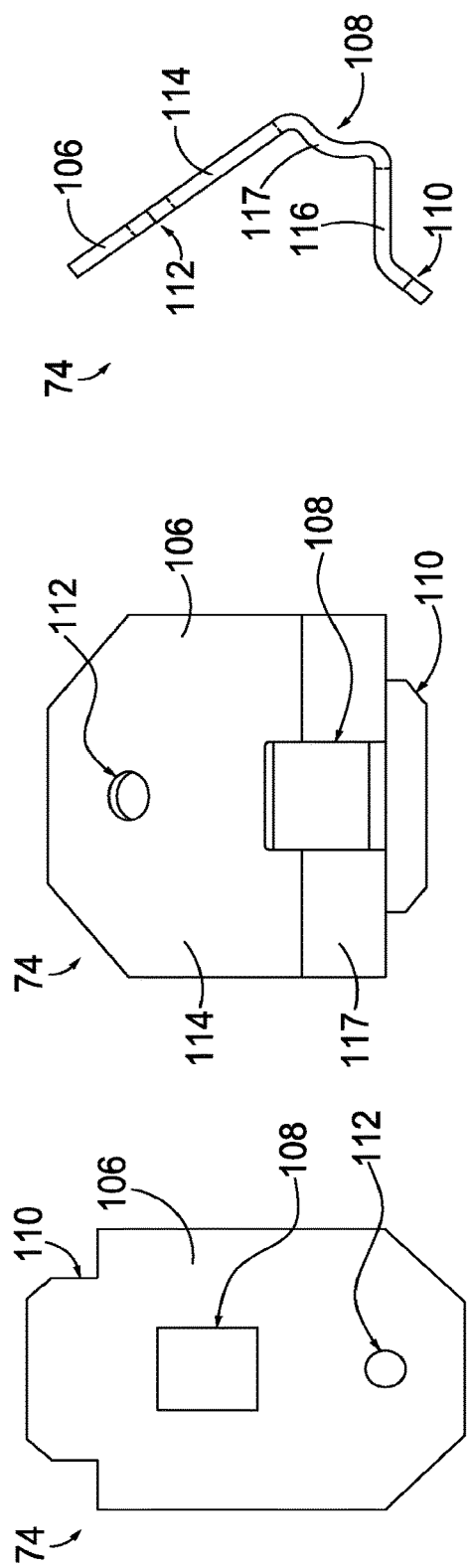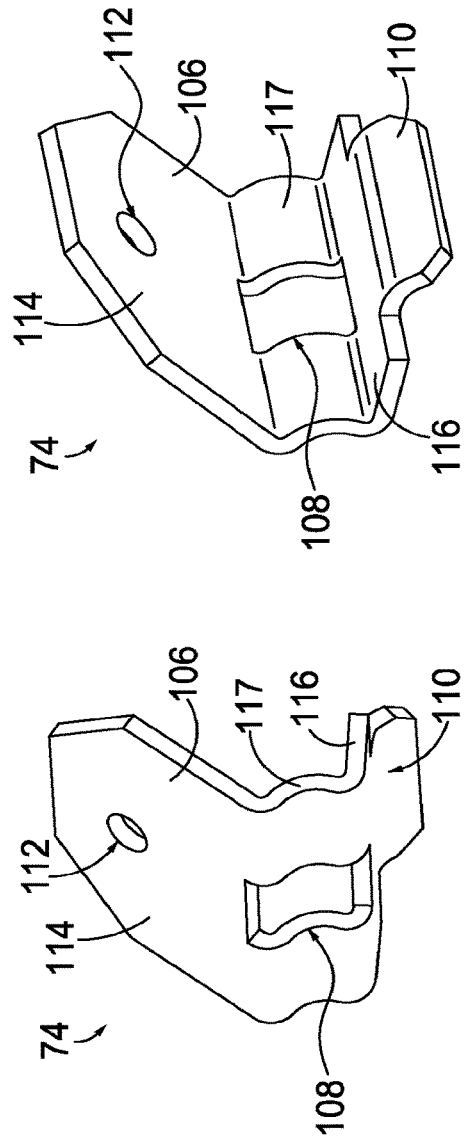

IRRIGATION SYSTEM HAVING IMPROVED CONSTRUCTION SYSTEM AND ADJUSTABLE CROWN HEIGHT

CROSS-REFERENCE TO RELATED APPLICATIONS

This application is a divisional of U.S. application Ser. No. 16/378,088, filed Apr. 8, 2019, and entitled "Irrigation System Having Improved Construction System and Adjustable Crown Height." The entirety of the aforementioned application is hereby incorporated herein by reference.

TECHNICAL FIELD

Aspects provided relate to irrigation systems. More specifically, aspects provided relate to an improved assembly system for agricultural irrigation systems where the crown height of a pipeline is easily adjustable.

BACKGROUND

Irrigation systems generally include a pipeline adapted to communicate fluid from a fluid source to a field. The pipeline is typically supported above the field by one or more towers and a truss system. Previous truss systems were connected to either end of the pipeline under tension, which resulted in a compression load applied to the pipeline and a crown of the pipeline deflecting to a crown height. In previous irrigation systems, however, this crown height was not readily adjustable.

In addition, previous truss systems included many components (e.g., mating plates, struts, cross-members, braces, etc.) coupled together at intermediate truss joints. Each of the many components was separately fastened at the intermediate truss joint, requiring an abundant number of fasteners and time to assemble the entire irrigation system.

SUMMARY

At a high level, aspects herein are directed to an irrigation system having an improved truss connection system and a pipeline with an adjustable crown height. The truss system may be connected on either end of the pipeline. The truss system may include a first truss rail and a second truss rail coupled on either end to a respective end of the pipeline. Each truss rail may include a plurality of headed truss rods coupled together end-to-end with cooperating mating members. One or more strut members may be coupled on one end to the cooperating mating members and on the opposing end to the pipeline. A cross-member may be coupled on one end to the cooperating mating members of the first truss rail and on the opposing end to cooperating mating members of the second truss rail. A single fastener may fasten the first cooperating member, the second cooperating member, the one or more strut members and the cross-member together. Using a single fastener may be advantageous not only because it reduces the number of components needed to form the truss system, but also because it reduces or eliminates racking associated with using multiple fasteners. For example, when multiple fasteners are used to secure the cooperating members, the struts, and the cross-member the force transferred from each fastener is often oriented in different directions from a direction of one or more of the other fasteners causing shear and torsion to be applied to the one or more other fasteners.

The truss rails may have an adjustable length, adjustment of which may change the crown height of the pipeline. The adjustable length may be provided by changing a relative position of the plurality of headed truss rods to one another. Heads of adjacent truss rods may be held in a first position by the cooperating mating members. The heads of the adjacent truss rods are separated from one another by a first distance when in the first position. The irrigation system has a first profile and the pipeline has a first crown height when the truss rods are in the first position. The heads of the adjacent truss rods may be moved to a second position where the heads are closer to one another. One or more shims may be placed between the heads and the cooperating mating members to hold the heads in the second position. The heads of the adjacent truss rods in the second position are separated from one another by a second distance, which is smaller than the first distance. As a result, the overall length of the truss rail is decreased in the second position. Decreasing the length of the truss rails results in the ends of the pipeline connected to the truss system (e.g., the truss rails) to be pulled together and to deflect the pipeline to a second crown height that is higher than the first crown height.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 2A depicts a front elevation view of an end portion of a truss rod, in accordance with aspects hereof;

FIG. 2B depicts a right side elevation view of the end portion of the truss rod of FIG. 2A;

FIG. 2C depicts a left side elevation view of the end portion of the truss rod in cross-section taken along line 2C-2C in FIG. 2A;

FIG. 2D depicts a perspective view of the end portion of the truss rod of FIG. 2A;

FIG. 5A depicts a top plan view of a first mating member prior to a shaping process, in accordance with aspects hereof;

FIG. 5B depicts a front elevation view of the first mating member of FIG. 5A after the shaping process;

FIG. 5C depicts a side elevation view of the first mating member of FIG. 5B;

FIG. 5D depicts a front perspective view of the first mating member of FIG. 5B;

FIG. 5E depicts a rear perspective view of first mating member of FIG. 5B;

FIG. 6A depicts a top plan view of a second mating member prior to a shaping process, in accordance with aspects hereof;

FIG. 6B depicts a front elevation view of the second mating member of FIG. 6A after the shaping process;

FIG. 6C depicts a side elevation view of the second mating member of FIG. 6B;

FIG. 6D depicts a front perspective view of the second mating member of FIG. 6B;

FIG. 6E depicts a rear perspective view of second mating member of FIG. 6B;

DETAILED DESCRIPTION

Figure 1A:
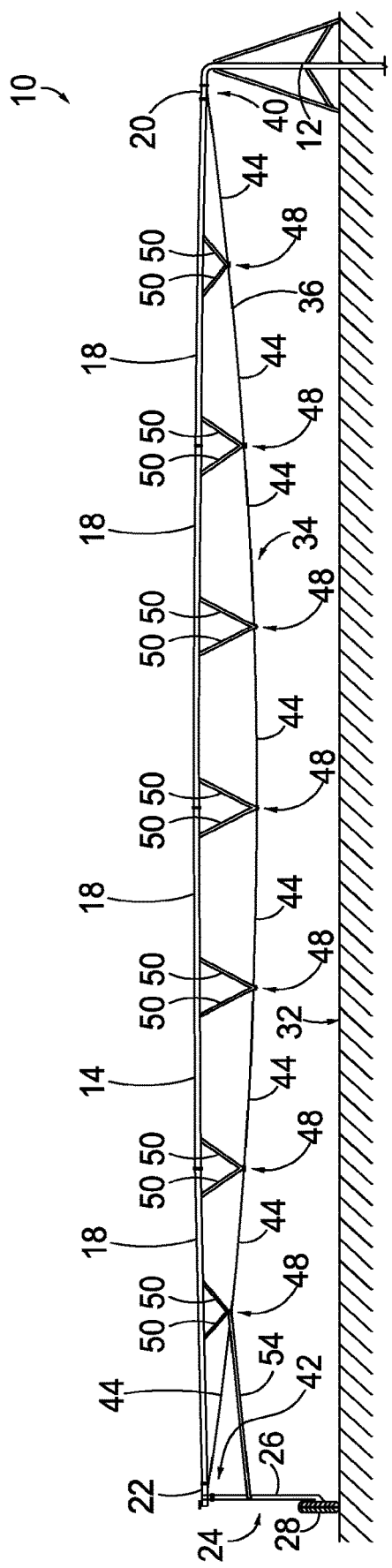
FIG. 1A depicts a front elevation view of a section of an irrigation system, in accordance with aspects hereof.

The subject matter of the present invention is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" and/or "block" might be used herein to connote different elements of methods employed, the terms should not be interpreted as implying any particular order among or between various steps herein disclosed unless and except when the order of individual steps is explicitly stated.

At a high level, aspects herein are directed to an irrigation system having a pipeline with an adjustable crown height and a truss system with a simplified construction. The truss system may be connected on either end of the pipeline. The truss system may include a first truss rail and a second truss rail coupled on either end to a respective end of the pipeline. Each truss rail may include a plurality of headed truss rods coupled together end-to-end with cooperating mating members. One or more strut members may be coupled on one end to the cooperating mating members and on the opposing end to the pipeline. A cross-member may be coupled on one end to the cooperating mating members of the first truss rail and on the opposing end to cooperating mating members of the second truss rail. A single fastener may fasten the first cooperating member, the second cooperating member, the one or more strut members and the cross-member together.

The truss rails may have an adjustable length, adjustment of which may change the crown height of the pipeline. The adjustable length may be provided by changing a relative position of the plurality of headed truss rods to one another. Heads of adjacent truss rods may be held in a first position by the cooperating mating members. The heads of the adjacent truss rods are separated from one another by a first distance when in the first position. The irrigation system has a first profile and the pipeline has a first crown height when the truss rods are in the first position. The heads of the adjacent truss rods may be moved to a second position where the heads are closer to one another. One or more shims may be placed between the heads and the cooperating mating members to hold the heads in the second position. The heads of the adjacent truss rods in the second position are separated from one another by a second distance, which is smaller than the first distance. As a result, the overall length of the truss rail is decreased in the second position. Decreasing the length of the truss rails results in the ends of the pipeline connected to the truss system (e.g., the truss rails) to be pulled together and to deflect the pipeline to a second crown height that is higher than the first crown height.

Aspects hereof may be described using relative location terminology. For example, the term "proximate" is intended to mean on, about, near, by, next to, at, and the like. The term "about" when used in relation to measurements means within ±10% of a designated value. Therefore, when a feature is proximate another feature, it is close in proximity but not necessarily exactly at the described location or in abutting contact, in some aspects. Additionally, the term "distal" refers to a portion of a feature herein that is positioned away from a midpoint of the feature. Terms such as "coupled," "attached," "fastened," "secured," "affixed," and the like may mean elements that are releasably attached or connected to one another using, for example, bolts and the like. These terms may further mean elements that are permanently attached to one another using, for example, rivets, welding, and the like.

The term "releasable fastener" as used herein refers to a fastener system that can be repeatedly, selectively, coupled and uncoupled to respectively secure or disengage components from each other. In line with this, the term "complementary" when describing components of a releasable fastener system means components having structures that mechanically engage with each other (e.g., a nut and a bolt may mechanically engage one another at threads formed thereon).

The term "end" when used in relation to the end of a pipeline, rail, or truss rod may mean a terminal edge of said component. Such term may also mean a portion of the pipeline, rail, or truss rod within about 12 inches of the terminal edge of said component. The term "about" when used in relation to measurements means within ±10% of a designated value. The terms "axial direction" and "longitudinal direction" are used interchangeably herein and mean the direction the pipeline, rail, or truss rod extends from a first end of said component to a second end of said component. The term "substantially" when used in relation to positional descriptions means primarily.

Figure 1B:
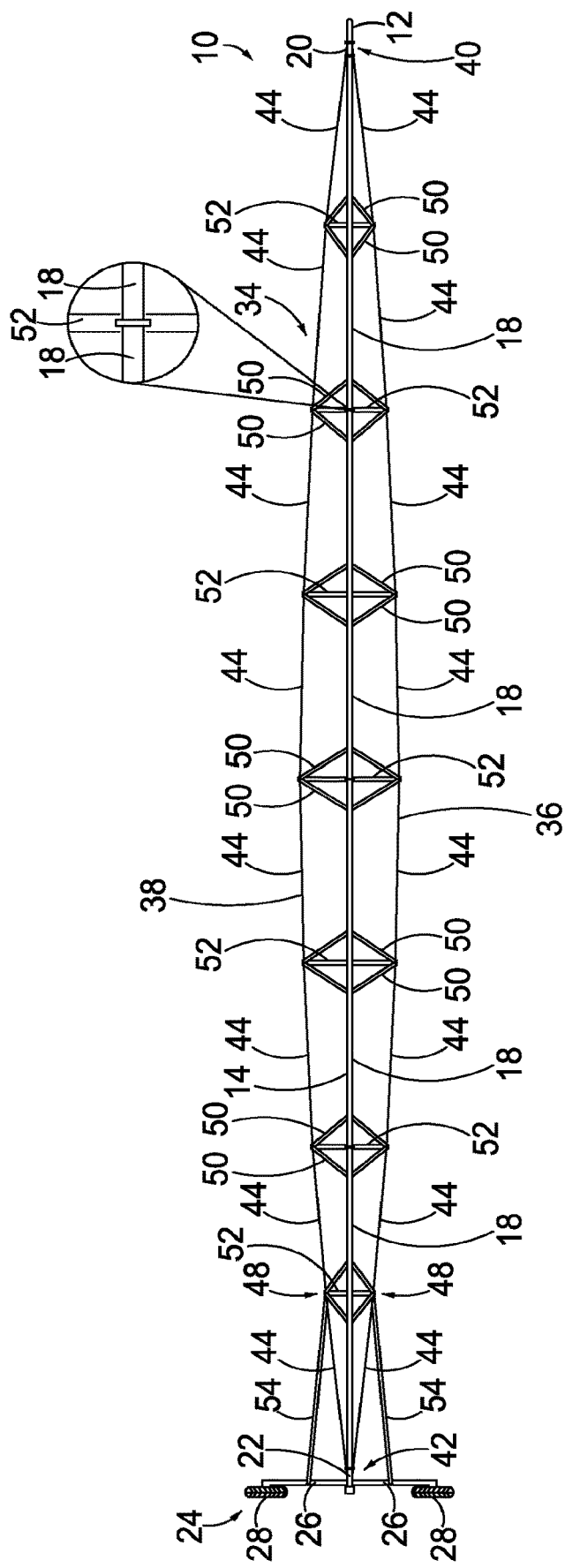
FIG. 1B depicts a top plan view of the irrigation system of FIG. 1A.

Referring now initially to FIGS. 1A and 1B, an aspect of an irrigation system 10 is illustrated. The illustrated irrigation system 10 is a section of a center-pivot type irrigation system that revolves or rotates around a fluid source 12. In other aspects, however, the irrigation system may be a linear or lateral move irrigation system, or any other type of irrigation system. The illustrated irrigation system 10 includes a pipeline 14 coupled to the fluid source 12. The pipeline 14 extends from the fluid source 12 to a tower 24. The pipeline 14 may comprise a plurality of pipe segments 18 coupled to one another. In other aspects, the pipeline 14 may comprise a single pipe segment.

A first segment 20 of the pipeline 14 may connect to the fluid source 12 with a span coupling. The first segment 20 may include the span coupling, or a portion of the span coupling (e.g., a hook), for detachably coupling to the fluid source 12. The span coupling may comprise a hook and receiver type span coupling. For example, the first segment 20 may include a hook that may be detachably coupled to a receiver (e.g., a ring) connected to the fluid source 12. Such a span coupling may provide a highly efficient point of rotation for the pipeline 14 when placed in the center of the pipeline 14.

In the illustrated aspect, the pipeline 14 is capped at a last segment 22. It may be advantageous in some aspects, however, to provide a multi-span irrigation system to permit irrigation of a greater area. For example, the irrigation system 10 may comprise a first span and a second irrigation system may comprise a second span, an ancillary span, or a swing arm that may be attached to the first span. Thus, the multi-span irrigation system may be composed of two or more irrigation systems (e.g., the irrigation system 10). In this example, the second span, ancillary span, or swing arm may be coupled to the last segment 22 of the pipeline 14 of the irrigation system 10 to increase the area over which the combined irrigation system travels. Thus, the last segment 22 of the pipeline 14 may include a span coupling (e.g., a hook and a receiver), or a portion of a span coupling, (e.g., a receiver) for connecting to a span coupling (e.g., a hook) of the second span, ancillary span, or swing arm. Hook-and-receiver type span couplings are preferred, but other types of span couplings may also be useful with the present invention.

The tower 24 supports the last segment 22 of the pipeline 14. In other aspects, the tower 24 may support an intermediate portion of the pipeline 14 resulting in a portion of the pipeline 14 cantilevered past the tower 24. The tower 24 includes one or more support legs 26 and one or more wheels 28. In some aspects, the tower 24 is self-propelled and includes a drive unit that causes the wheels to rotate to carry the pipeline 14 over a field 32. In other aspects, other equipment (e.g., electronics) may be mounted on the tower 24.

A truss system 34 includes a first truss rail 36 and a second truss rail 38 (FIG. 1B). In some aspects, the truss system may include only one truss rail. In other aspects, the truss system may include more than two truss rails. The first truss rail 36 and the second truss rail 38 are substantially similar and the following description of the first truss rail 36 applies equally to the second truss rail. A first end 40 of the first truss rail 36 is coupled to the first segment 20 of the pipeline 14. Likewise, a second end 42 of the first truss rail 36 is coupled to the last segment 22 of the pipeline 14. The first truss rail 36 includes a plurality of headed truss rods 44 coupled end-to-end between a pair of cooperating mating members 46 (best seen in FIGS. 3A-3D and 4A-4F) at each of one or more intermediate joints 48.

The truss system 34 includes a plurality of pairs of struts 50 extending from the pipeline 14 with which they are coupled via conventional means (e.g., fastened to a plate that is welded to the pipeline 14). Each pair of struts 50 additionally is coupled to each other at one of the intermediate joints 48, as more fully described below. The truss system 34 further includes a plurality of cross-members 52 (FIG. 1B). Each said cross-member 52 extends from one of the intermediate joints 48 of the first truss rail 36 to an intermediate joint of the second truss rail 38 and spaces the intermediate joints, and thereby the first and second truss rails 36, 38, apart. In the illustrated embodiment, a brace 54 also extends from the tower 24 to one of the intermediate joints 48 (best seen in FIGS. 1A, 1B and 4F) to provide additional support and to stabilize the tower 24. In some aspects, one or more of the intermediate joints may comprise flying joints that do not have a strut 50, a cross-member 52, or a brace 54 attached. Thus, these flying joints include only adjacent truss rods 44 coupled end-to-end between the pair of cooperating members 46.

Turning now to FIGS. 2A-2D, an embodiment of an end structure 56 of the plurality of headed truss rods 44 is shown. Each truss rod 44 extends between opposite end structures 56. Each of the end structures 56 is substantially similar to one another and the following description applies equally to each of the end structures 56. Each truss rod 44 has a first diameter 58 (shown in cross-section in FIG. 2C). The end structure 56 of each truss rod 44 begins where the diameter increases from the first diameter 58. In general, the end structure 56 includes a transition portion 60 having a variable and increasing diameter, a clamping portion 62 having a second diameter 64 larger than the first diameter 58, and a head portion 66 having a third diameter 68 larger than the first or second diameters 58, 64. The increasing diameters of the end structure 56 may provide greater strength to the truss rod 44, particularly when tension forces are applied to the head portion 66. The head portion 66 has an inwardly facing contact surface 70 and an outwardly facing end surface 71 positioned opposite the contact surface 70. When the first truss rail 36 is assembled, the clamping portion 62 and the contact surface 70 of each truss rod 44 engage the pair of cooperating mating members 46, as described in greater detail below. In other aspects, the end structure of each truss rod may comprise only a head portion such that the first diameter of the truss rod transitions directly to the head portion. In the illustrated aspect, the head portion 66 is circular shaped (best seen in FIG. 2B). In other aspects, the head portion 66 may have any suitable shape (e.g., trilobular, rectangular, ovular, etc.).

In some aspects, the truss rods 44 may have varying lengths and diameters. Identification markings may be applied to the truss rods 44 as a way to quickly distinguish one size of truss rod from another. For example, the markings may be applied to the head portion 66 of each truss rod 44. In some aspects, the markings may be embossed or engraved around the circumference of the head portion 66. In other aspects, the markings may be embossed or engraved on the end surface 71. In still other aspects, the markings may be applied to any other portion of the end structure 56 or the truss rod 44.

Figure 3B:
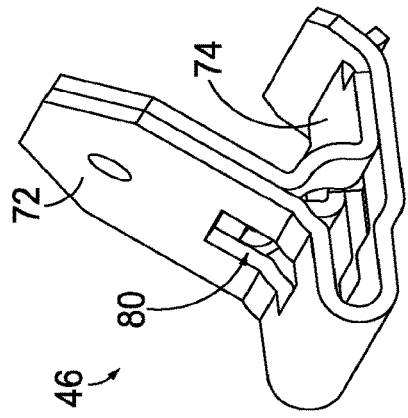
FIG. 3B depicts a perspective view of the pair of cooperating mating members of FIG. 3A.
Figure 3D:
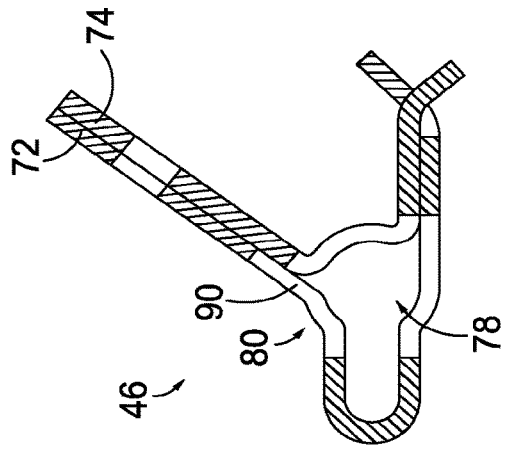
FIG. 3D depicts a cross-section of the pair of cooperating mating members of FIG. 3A taken along line 3D-3D in FIG. 3C.
Figure 3A:
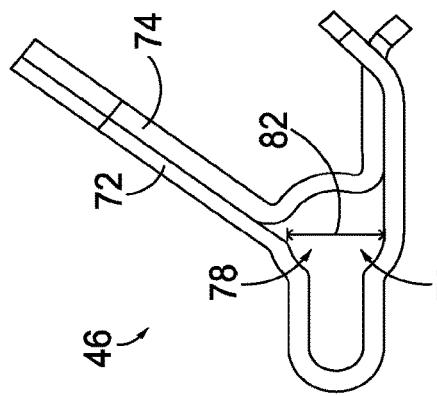
FIG. 3A depicts a side elevation view of a pair of cooperating mating members, in accordance with aspects hereof.
Figure 3C:
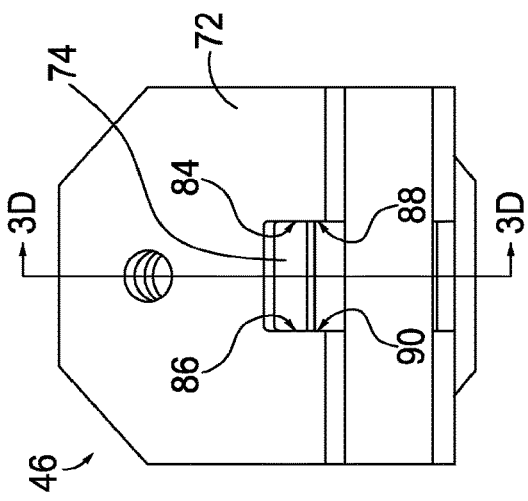
FIG. 3C depicts a front elevation view of the pair of cooperating mating members of FIG. 3A.

With reference to FIGS. 3A-3D and 4A-4C, the pair of cooperating mating members 46 includes a first mating member 72 and a second mating member 74. When mated with one another (e.g., in FIG. 3A), the first mating member 72 and the second mating member 74 cooperate to define a first passageway 76, a second passageway 78, and a retaining pocket 80. The first passageway 76 may be sized to receive a first truss rod 44a (shown in FIGS. 4A and 4B), the end structure 56 of the first truss rod 44a, or portions of the first truss rod 44a and the end structure 56. Likewise, the second passageway 78 may be sized to receive a second truss rod 44b (shown in FIGS. 4A and 4B), the end structure 56 of the second truss rod 44b, or portions of the second truss rod 44b and the end structure 56. The first passageway 76 and the second passageway 78 may be axially aligned and extend towards the retaining pocket 80 positioned at an intermediate point in the pair of cooperating mating members 46. In some aspects, the first passageway 76 and the second passageway 78 each have the same diameter, which is a fourth diameter 82 (FIG. 3A). The fourth diameter 82 of the first passageway 76 and the second passageway 78 is smaller than the third diameter 68 of the head portion 66.

Figure 4B:
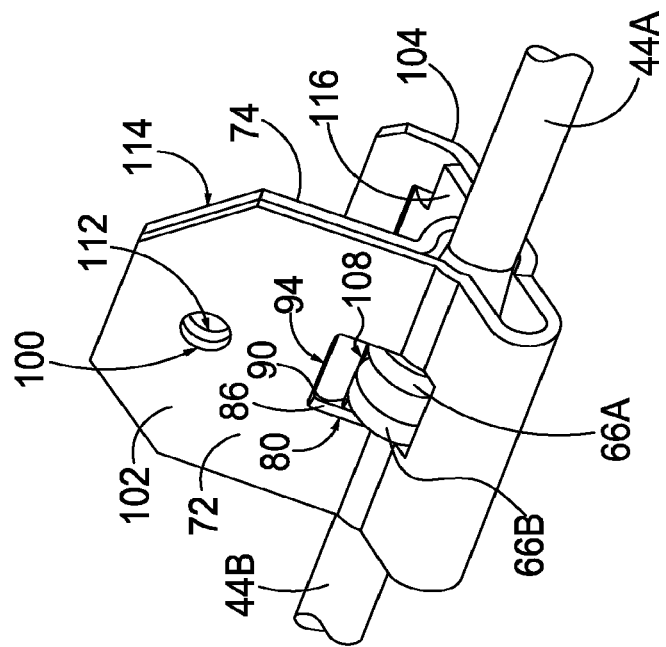
FIG. 4B depicts an unexploded perspective view of the components of the intermediate joint of the truss rail of FIG. 4A.
Figure 4A:
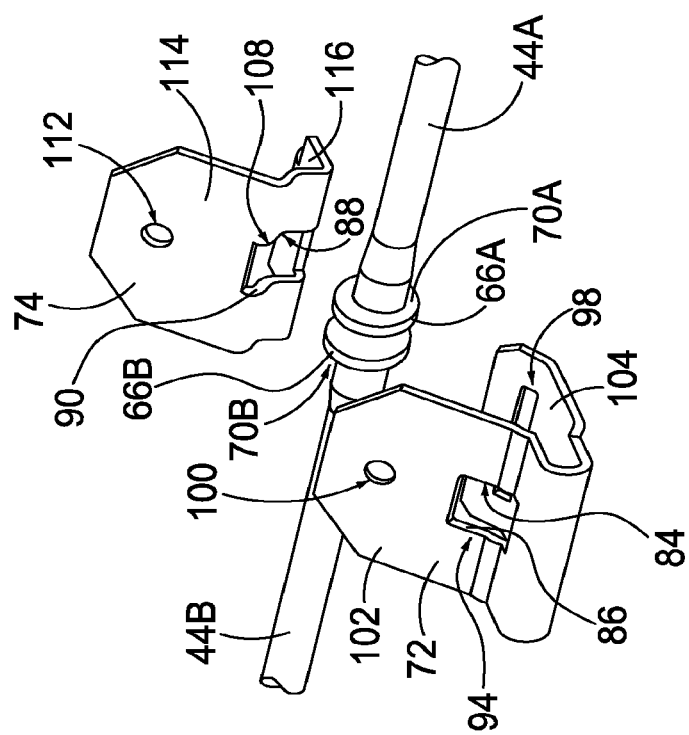
FIG. 4A depicts an exploded perspective view of components of an intermediate joint of a truss rail, in accordance with aspects hereof.
Figure 4D:
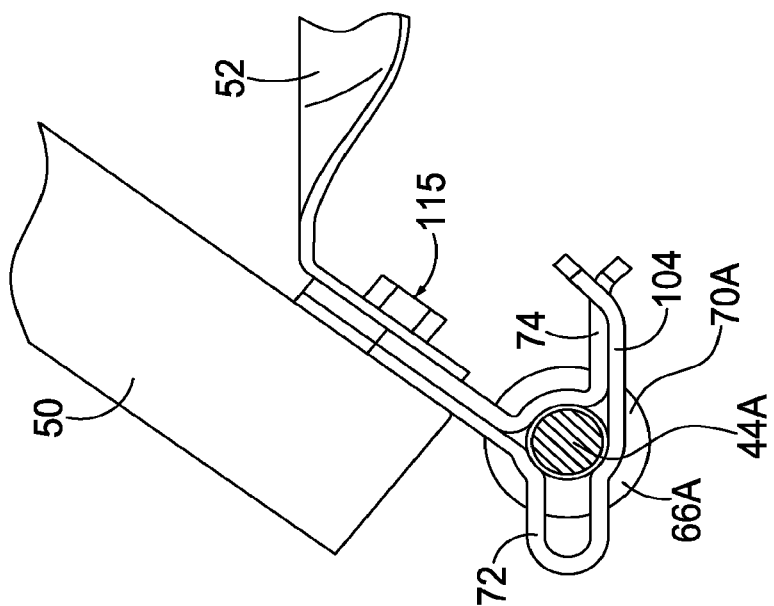
FIG. 4D depicts a side elevation view in partial cross-section of the assembled intermediate joint of t truss rail of FIG. 4C taken along line 4D-4D in FIG. 4C with a cross-member also attached, in accordance with aspects hereof.
Figure 4C:
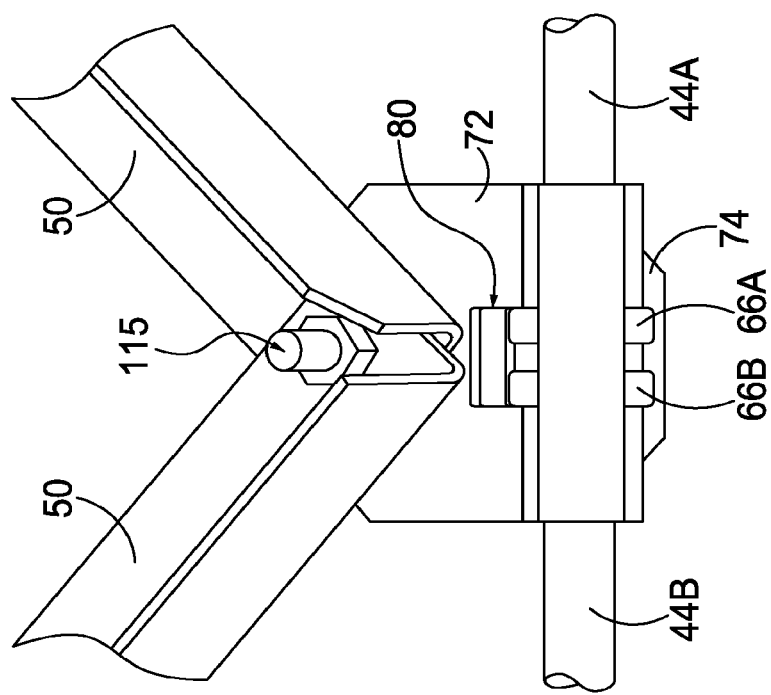
FIG. 4C depicts a front elevation view of an assembled intermediate joint of the truss rail of FIG. 4A with a pair of struts attached, in accordance with aspects hereof.
Figure 4E:
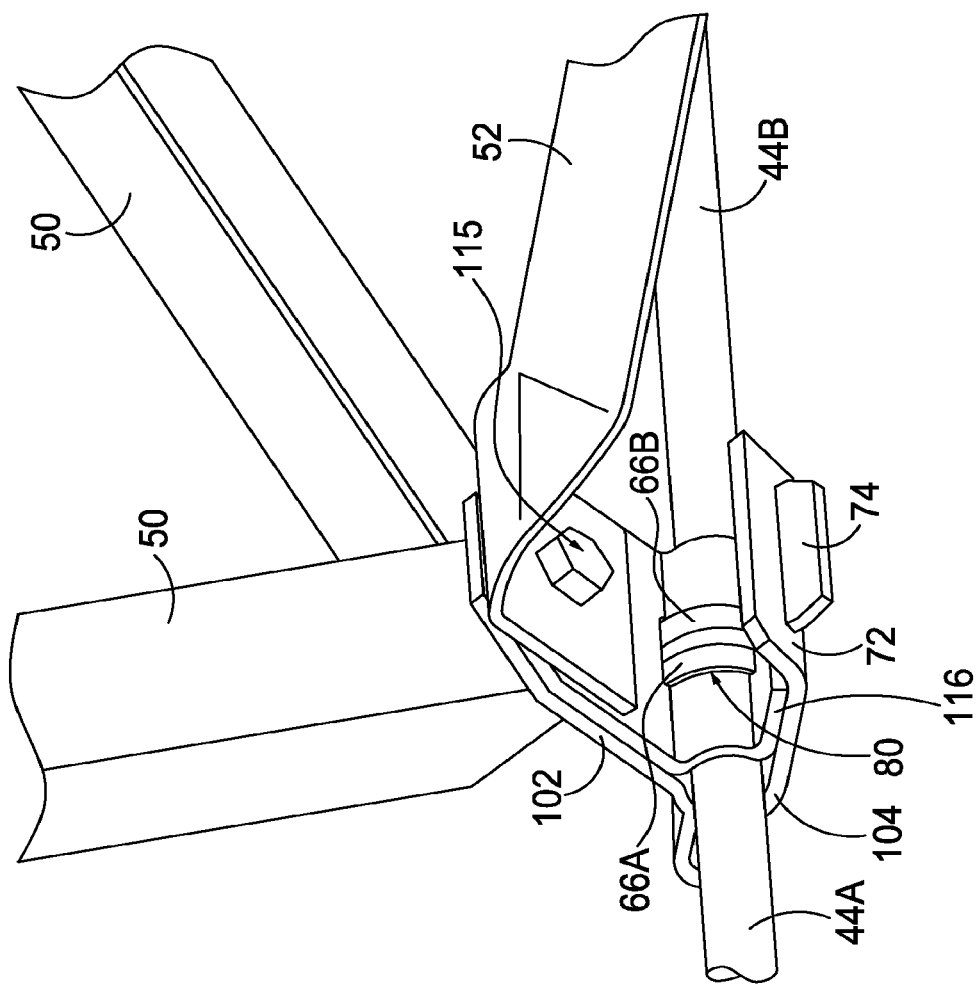
FIG. 4E depicts a rear perspective view of the assembled intermediate joint of the truss rail of FIG. 4C.
Figure 4F:
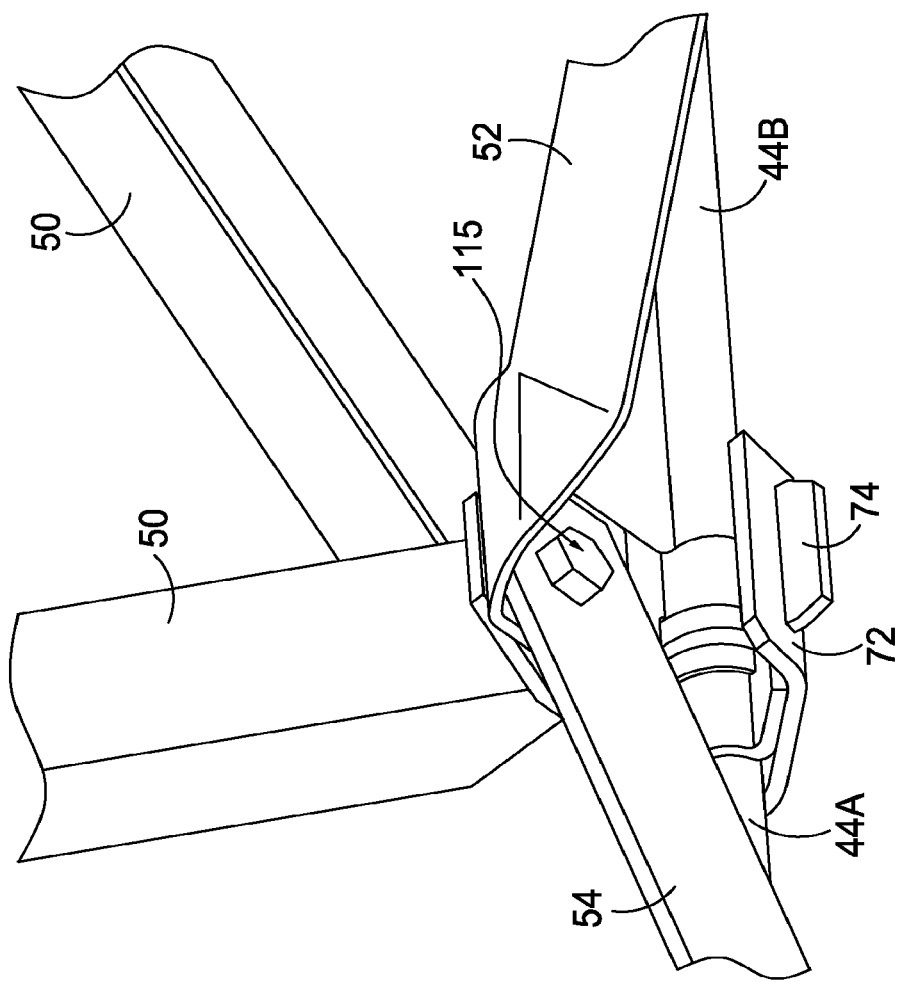
FIG. 4F depicts a rear perspective view of the assembled intermediate joint of the truss rail of FIG. 4E with a brace attached, in accordance with aspects hereof.

The retaining pocket 80 is formed in the illustrated aspect at a position where a portion of the first mating member 72 and a portion of the second mating member 74 have been removed (i.e., at apertures in the member 72, 74). Thus, a first sidewall 84 and a second sidewall 86 are formed in the first mating member 72 and a third sidewall 88 and a fourth sidewall 90 are formed in the second mating member 74 (FIG. 4A). When assembled, the contact surface 70a of the first truss rod 44a is prevented from moving longitudinally through the first passageway 76 in one direction by the first sidewall 84 and the third sidewall 88. Although not illustrated, the contact surface 70b is similarly restrained by the second sidewall 86 and the fourth sidewall 90 in an opposite direction. In other words, the third diameter 68 is larger than the fourth diameter 82.

Although the retaining pocket 80 is shown as a single space wherein the head portion 66 of both the first truss rod 44a and the second truss rod 44b are both restrained, other aspects may have separate retaining pockets for the head of each truss rod. In some aspects, the retaining pocket 80 may be an enclosed chamber having a diameter larger than the third diameter 68. For example, a cover (not shown) may be attached to the first mating member 72 and/or the second mating member 74 to enclose the retaining pocket 80. These aspects may be advantageous to prevent damage to vegetation that may enter the retaining pocket 80 when the pipeline 14 (shown in FIGS. 1A and 1B) is moved over the field 32 (shown in FIG. 1A).

Referring now to FIGS. 5A-5E and 6A-6E, the first mating member 72 and the second mating member 74 will now be discussed. The first mating member 72 may be formed from a plate 92 shaped as shown in FIG. 5A. The plate 92 has a first aperture 94 and a second aperture 96 configured for providing portions of the retaining pocket 80. The plate 92 also includes a slot 98 and a third aperture 100. The slot 98 and the third aperture 100 are used to couple the first mating member 72 to the second mating member 74. As shown between FIG. 5A and FIGS. 5B-5E, the plate 92 may be bent into the desired shape. On opposite sides of a middle portion that receives the truss rod during use, the plate 92 may include an upper flange 102 and a lower flange 104. The aperture 100 may be formed in the upper flange 102 and the slot 98 may be formed in the lower flange 104. Positioning the lower flange 104 substantially parallel to a field surface in use may prevent snagging of vegetation during operation of the irrigation system 10. The upper flange 102 may extend in a first direction to a first radiused portion 103. A U-shaped panel 105 may extend from the first radiused portion 103 in a second direction to a curved portion and return from the curved portion to a second radiused portion 107. The lower flange 104 may extend from the second radiused portion 107. In some aspects, the lower flange 104 extends from the second radiused portion 107 in the second direction.

The second mating member 74 may be formed from a plate 106 shaped as shown in FIG. 6A. The plate 106 has a fourth aperture 108 configured for providing a portion of the retaining pocket 80. For example, when assembled the first mating member 72 and the second mating member 74 are aligned such that the first aperture 94, the second aperture 96, and the fourth aperture 108 define the retaining pocket 80. The plate 106 also includes a plug 110 and a fifth aperture 112. The plug 110 and the fifth aperture 112 are used to couple the second mating member 74 to the first mating member 72. For example, the plug 110 may be inserted through the slot 98 and a fastener 115 (best seen in FIGS. 4A-4C) may be inserted through the third aperture 100 and the fifth aperture 112. As shown between FIG. 6A and FIGS. 6B-6E, the plate 106 may be bend into the desired shape. The desired shape is complimentary with the desired shape of the plate 92. For example, the plate 106 may include an upper flange 114, configured for mating with the upper flange 102 of the first mating member 72, and a lower flange 116, configured for mating with the lower flange 104 of the first mating member 72, as shown in FIGS. 3A-3D and 4A-4C. The upper flange 114 may extend in the first direction proximate the upper flange 102. The upper flange 114 may extend to a third radiused portion 117. The lower flange 116 may extend from the third radiused portion 117 in the second direction proximate the lower flange 104. The first radiused portion 103, the second radiused portion 107 and the third radiused portion 117 may cooperate to define the first passageway 76 and the second passageway 78. The radius defining the radiused portions 103, 107, and 117 may be sized so that such portions contact and apply a clamping force to the clamping portions 62 of received truss rods 44 at the first and second passageways 76, 78.

In this way the pair of cooperating mating members 46 may be coupled together with only a single fastener (e.g., fastener 115, which may comprise a bolt). Further, as discussed above, each of the struts 50 may be coupled to the pair of cooperating mating members 46 (e.g., at the upper flange 102) by the fastener 115. Similarly, the cross-member 52 may be coupled to the pair of cooperating members 46 (e.g., at the upper flange 114) by the fastener 115. Thus, a single fastener (e.g., fastener 115) may couple all of the components of an intermediate joint 48. In further aspects, the fastener 115 may couple the first mating member 72, the second mating member 74, the struts 50, the cross-member 52 and the brace 54 (e.g., at the first intermediate joint inside the tower 24 shown in FIG. 4F).

Fastening the pair of cooperating members 46, each of the struts 50, the cross-member 52 and the brace 54 with a single fastener is advantageous over prior irrigation systems that used three to four fasteners at each intermediate joint (e.g., one for each said component). Thus, across the irrigation system 10, which may have many intermediate joints on both the first truss rail 36 and the second truss rail 38, a significant number of fasteners can be eliminated. This reduction of components decreases the expense of the irrigation system 10 and simplifies the assembly of the irrigation system 10. For example, when the irrigation system 10 is assembled at a site, the assembly is streamlined by having fewer fasteners to fasten which results in decreased assembly time and decreased assembly complexity. In addition, fastening each of these components with a single fastener eliminates or reduces misalignment of the pair of cooperating members 46 (e.g., first mating member 72 and second mating member 74) that can occur from using multiple (e.g., 3-4) fasteners at each intermediate joint (e.g., a myriad of stacking tolerances across multiple apertures and fasteners at each joint). Further, each fastener introduces slack into the truss system 34 and using a single fastener reduces or eliminates this slack, and as a result reduces or eliminates loosening of the fasteners during operation of the irrigation system thereby increasing the safety and integrity of the system.

Figure 7B:
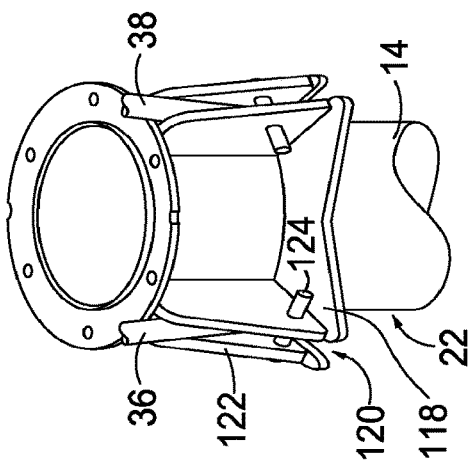
FIG. 7B depicts a fragmentary side perspective view of a portion of a last segment of pipeline of an irrigation system, in accordance with aspects hereof.
Figure 7C:
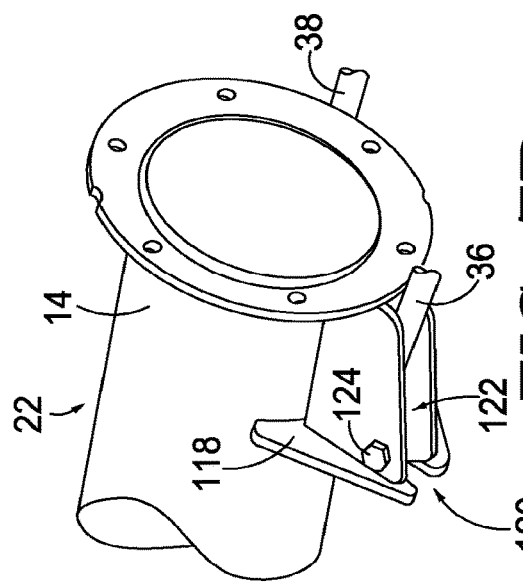
FIG. 7C depicts a bottom perspective view of the portion of the last segment of pipeline of an irrigation system of FIG. 7B.
Figure 7A:
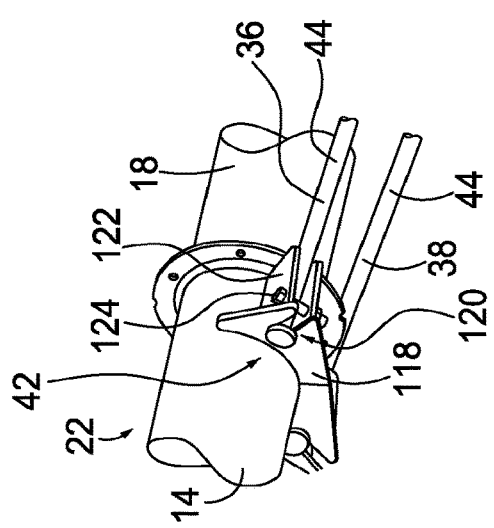
FIG. 7A depicts a fragmentary, perspective view of a second end of an irrigation system, in accordance with aspects hereof.

Turning to FIGS. 7A-7C, the connection between the first truss rail 36 and the last segment 22 is illustrated. A first plate 118 is attached to the pipeline 14 and includes a slot 120. The first plate 118 may be aligned perpendicular to the longitudinal axis of the pipeline 14. A channel 122 may be aligned with the slot 120 and extend in a direction parallel to the longitudinal axis of the pipeline 14. For example, the channel 122 may comprise a pair of second plates welded to the pipeline 14 and welded perpendicular to the first plate 118. The second end 42 of the first truss rail 36 may extend through the channel 122 and be received in the slot 120 of the first plate 118. The slot 120 has a width smaller than the diameter of the head portion 66 of the truss rod 44, thus movement of the truss rod 44 in one direction of the longitudinal direction is restrained. The slot 120 may restrain movement of the truss rod 44 in the lateral and vertical directions, except for in the direction that the slot 120 is open. A pin 124 may be used to restrain movement of the truss rod 44 in the direction of the slot 120.

Figure 8:
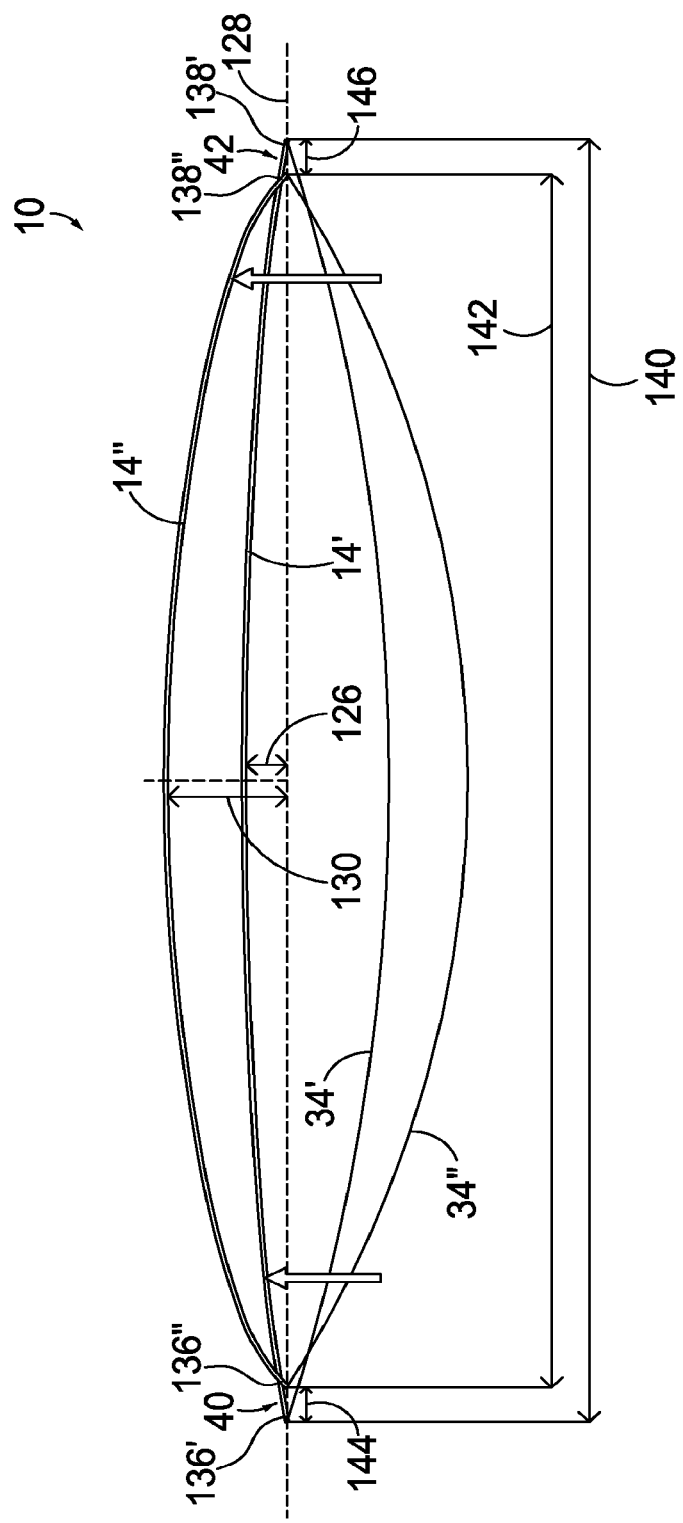
FIG. 8 depicts a front elevation view of a section or segment of an irrigation system with a pipeline having a first crown height under a first compression load and the pipeline having a second crown height under a second compression load, in accordance with aspects hereof.

Turning now to FIG. 8, two states of the irrigation system 10 are shown. The irrigation system 10 is simplified in FIG. 8 for sake of clarity of the following description, however the principles discussed below apply equally to the irrigation system 10 described above. Components of the irrigation system 10 in the first state are generally denoted with a single tic mark (e.g., 14') while components of the irrigation system 10 in the second state are generally denoted with a double tic mark (e.g., 14"). Generally, the irrigation system 10 is shown having a pipeline 14 coupled to a truss system 34.

In the first state, the first side 40 of the truss system 34' is connected to the pipeline 14' at a first coupling 136' and the second side 42 of the truss system 34' is connected to the pipeline 14' at a second coupling 138'. The first coupling 136' is spaced a first distance 140 from the second coupling 138'. The irrigation system 10 has a first profile in the first state and a crown of the pipeline 14' deflects vertically a first distance 126 from a longitudinal axis 128 extending substantially parallel above the field surface 32. The longitudinal axis 128 extends through a center of the pipeline 14 in the axial direction of the pipeline 14 when the crown of the pipeline 14 has zero deflection.

In the second state, the length of the truss system 34" along the truss rails has decreased resulting in the first coupling 136" being spaced a second distance 142 from the second coupling 138". As illustrated, the second distance 142 is smaller than the first distance 140. Decreasing the distance between the first coupling 136" and the second coupling 138" results in the crown of the pipeline 14" deflecting further vertically a second distance 130 from the longitudinal axis 128.

The illustrated aspect depicts both the first end 40 and the second end 42 moving towards one another as the irrigation system 10 moves from the first state to the second state. More specifically, the first coupling moves towards the second coupling a distance 144 and the second coupling moves towards first coupling a distance 146 that is equal to the distance 144. This movement may occur where neither end of the irrigation system 10 is fixed (e.g., a lateral-move system). Where one end of the irrigation system 10 is fixed (e.g., a center-pivot system), the free end may move towards the fixed end a distance equal to both the distance 144 plus the distance 146.

The increase in deflection of the pipeline 14 between the first state and the second state results from the pipeline 14 having a constant length while the truss system 34, or more specifically the truss rails, has an adjustable length. As described above, each truss rail includes a plurality of headed truss rods 44 coupled together end-to-end by the pair of mating members 46. Generally, the contact surface 70 of the head portion 66 of the truss rods 44 are held under tension against a side of the retaining pockets 80. This may be the condition of the truss rods 44 of the truss system 34' in the first state illustrated in FIG. 8. As discussed above and illustrated in the figures, however, the head portions 66 of adjacent truss rods 44 are spaced apart from one another when assembled in the retaining pockets 80. Thus, the head portions 66 of adjacent truss rods 44 may be moved towards one another, which results in the length of the truss rail decreasing. This may be the condition of the truss rods 44 of the truss system 34" in the second state illustrated in FIG. 8.

Figure 9:
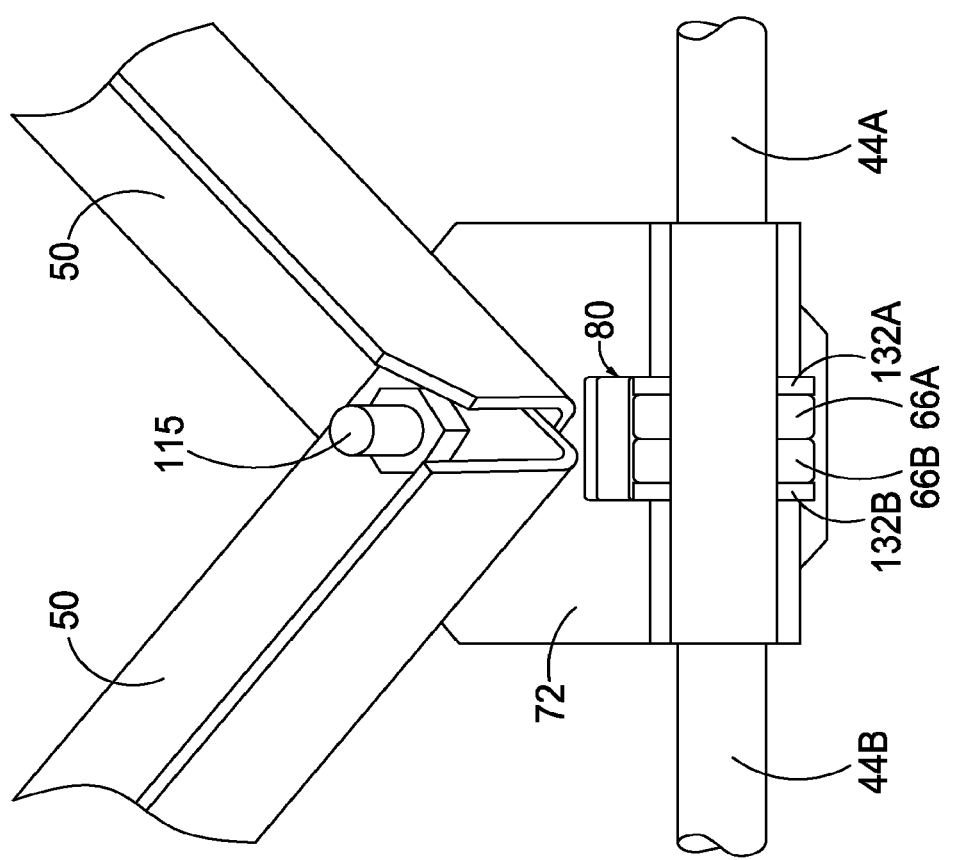
FIG. 9 depicts a front perspective view of an assembled intermediate joint of an irrigation system where shims have been placed in a retaining pocket to decrease a length of a truss rail to increase a first crown height of a section of an irrigation system, in accordance with aspects hereof.

One manner of holding the head portions 66 of adjacent truss rods 44 in a position spaced away from the side of the retaining pockets 80 is by placing one or more shims 132 (FIG. 9) in the intermediate joints 48 and/or at the first end 40 or the second end 42 of the truss rails. For example, one or more shims 132 may be placed in the retaining pocket 80 between the contact surface 70 of the head portion 66 and the sidewalls of the retaining pocket 80 (e.g., first sidewall 84, second sidewall 86, third sidewall 88, and fourth sidewall 90). Such an arrangement is illustrated in FIG. 9, where a first shim 132a is placed between the first head 66a of the first truss rod 44a and a second shim 132b is placed between the second head 66b of the second truss rod 44b.

Figure 10:
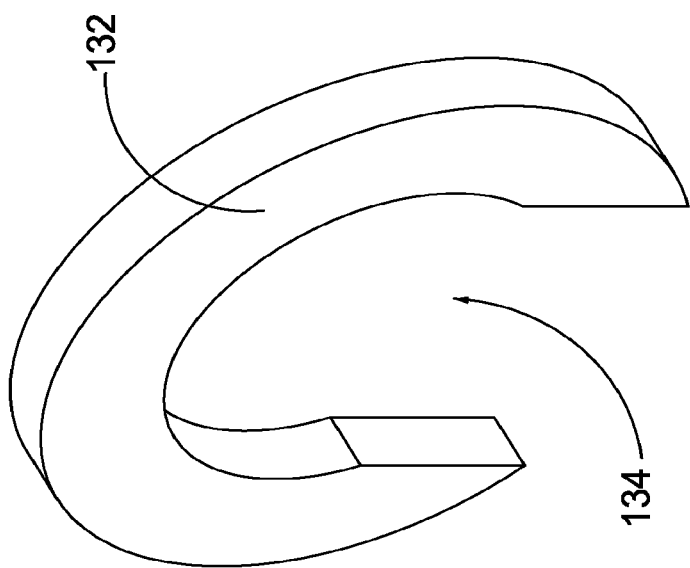
FIG. 10 depicts a perspective view of a shim of FIG. 9, in accordance with aspects hereof.

The shims 132 may have any suitable shape. One possible embodiment of the shims 132 is illustrated in FIG. 10. In the illustrated embodiment, the shims 132 have a C-shape where a mouth 134 may pass around the truss rod 44 and/or the clamping portion 62 of the end structure 56. In some aspects, more than one shim 132 per truss rod may be used in a receiving pocket 80. For example, the pipeline 14 may deflect the first distance 126 when no shims 132 are used and may deflect the second distance 130 when one shim 132 per truss rod is used in the receiving pocket 80. If a second shim 132 is added per truss rod in the receiving pocket 132, then the pipeline 14 may deflect a third distance that is greater than the second distance. Increasing the distance the pipeline 14 deflects, which is sometimes referred to as the crown height, may have the beneficial in certain applications.

Additionally, although some exemplary implementations of the embodiments described herein are shown in the accompanying figures, these implementations are not intended to be limiting. Rather, it should be understood that the various embodiments and aspects described herein may be implemented upon any irrigation system having truss rails comprised of a plurality of headed truss rods. For example, the irrigation system 10 has been described above in reference truss rods having a circular cross-section geometry. It is within the scope of the present invention that the above principals could be equally applied to rods having any other geometry (e.g., square stock).

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

What is claimed:

1. A cooperating pair of mating members for coupling together adjacent headed truss rods, the cooperating pair of mating members comprising:
   a first mating member having a first contoured shape, the first contoured shape comprising a first panel extending in a first direction to a first radiused portion, a U-shaped panel extending in a second direction out from the first radiused portion to a curve and returning from the curve in the second direction to a second radiused portion, and a second panel extending in the second direction away from the second radiused portion, the first panel having a first fastening aperture, the first radiused portion having a first pocket aperture, the second radiused portion having a second pocket aperture, and the second panel having a slot aperture; and
   a second mating member having a second contoured shape, the second contoured shape comprising a third panel extending in the first direction to a third radiused portion, and a fourth panel extending in the second direction away from the third radiused portion and terminating in a plug portion, the third panel having a second fastening aperture and the third radiused portion having a third pocket aperture,
   wherein when the first mating member is mated to the second mating member:
      the first fastening aperture and the second fastening aperture are aligned,
      the first radiused portion, the second radiused portion, and the third radiused portion define a first passageway in axial alignment with a second passageway, and
      one or more edges of the first pocket aperture, the second pocket aperture, and the third pocket aperture define a retaining pocket.

2. The cooperating pair of mating members of claim 1, wherein when the first mating member is mated to the second mating member the plug portion is received in the slot aperture.

3. The cooperating pair of mating members of claim 1, wherein when the first mating member is mated to the second mating member the first panel is adjacent to the third panel and the second panel is adjacent to the fourth panel.

4. The cooperating pair of mating members of claim 1, wherein the first mating member is a first unitary panel bent to the first contoured shape and the second mating member is a second unitary panel bent to the second contoured shape.

5. The cooperating pair of mating members of claim 1, wherein a cross-sectional area of each of the first passageway and the second passageway is smaller than a cross-sectional area of the retaining pocket.

6. The cooperating pair of mating members of claim 1, wherein the retaining pocket is configured to receive a first truss rod head and a second truss rod head.

7. The cooperating pair of mating members of claim 6, wherein the retaining pocket is configured to receive a first shim positioned between the first truss rod head and the first passageway and a second shim positioned between the second truss rod head and the second passageway.

8. The cooperating pair of mating members of claim 6, wherein the heads of the first truss rod head and the second truss rod head each have a trilobular disc shape.

9. The cooperating pair of mating members of claim 1, wherein the first fastening aperture and the second fastening aperture are configured to receive a fastener when the first mating member is mated to the second mating member.

10. The cooperating pair of mating members of claim 1 further comprising a cover coupled to at least one of the first mating member and the second mating member, the cover configured to enclose the retaining pocket.

* * * * *